Jan. 16, 1968  A. C. ADDINGTON  3,363,589
DOUGH DIVIDER
Filed Aug. 30, 1965
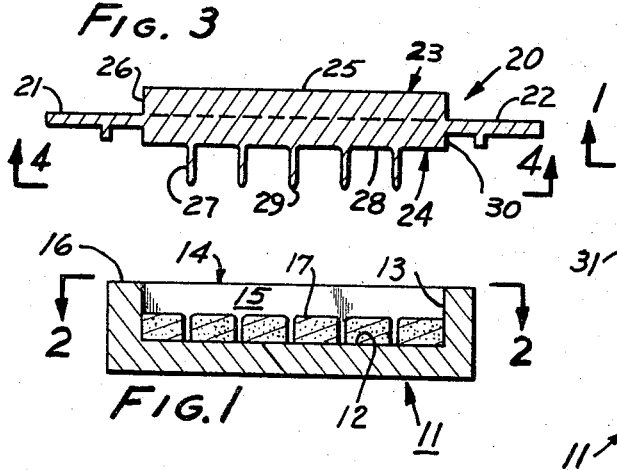
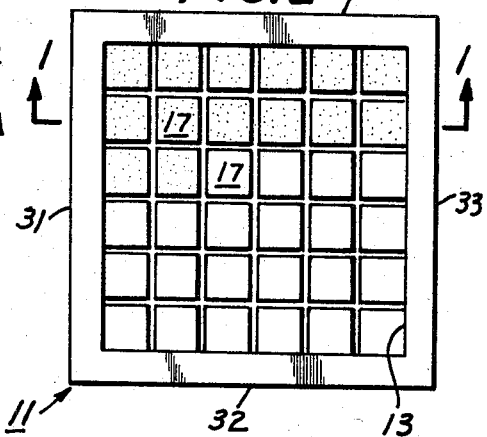
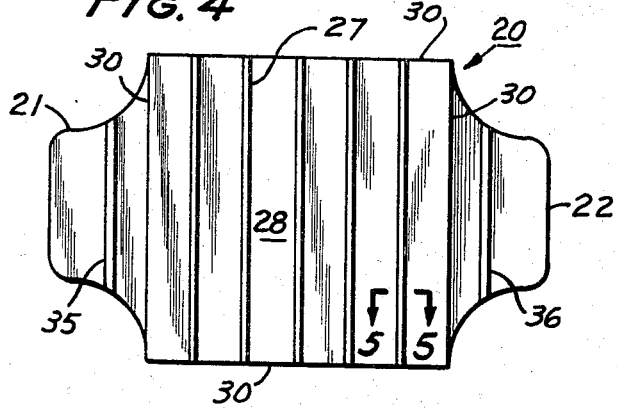
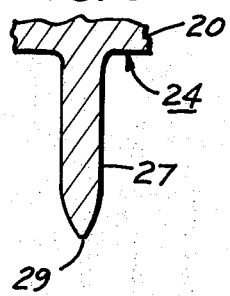
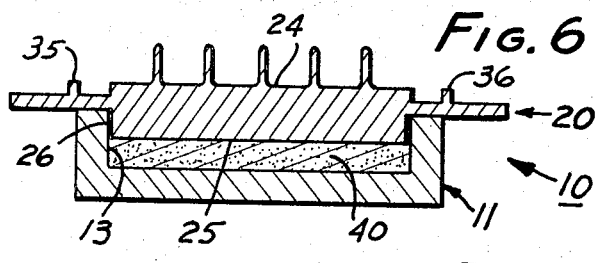
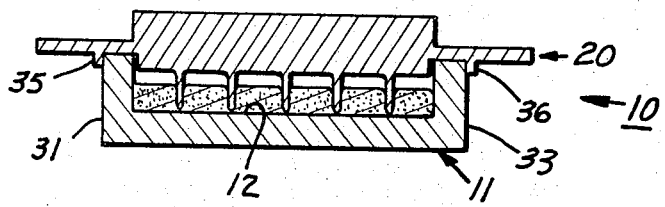
INVENTOR.
ANDREW C. ADDINGTON
BY
ATTORNEYS.

United States Patent Office 3,363,589
Patented Jan. 16, 1968

3,363,589
DOUGH DIVIDER
Andrew Curtis Addington, 10129 Annetta,
South Gate, Calif. 90280
Filed Aug. 30, 1965, Ser. No. 483,508
8 Claims. (Cl. 107—68)

ABSTRACT OF THE DISCLOSURE

A divider for dough and the like having a base member with an open-topped cavity receiving a reversible plate member for first flattening the dough and dividing it into sections. Plate member has a pressure surface for the flattening operation and a plurality of divider elements for the dividing operation.

---

This invention relates to a divider for dough and like materials.

The division of dough and like materials into carefully metered portions is a matter of particular interest in the baking industry, although it has applications in other fields wherein material of dough-like consistency is handled. Bakers, especially those who make doughnuts, fritters, biscuits and the like, rely very heavily upon portion control in order that their product will have a uniform cost and a uniform size and appearance. Heretofore there has been lacking a practical, inexpensive means for dividing up dough into controlled portions. Such efforts as have been made have involved machinery which costs more than the usual baker or doughnut shop can really afford.

It is an object of this invention to provide an elegantly simple, but effective means, for dividing initially weighed portions of dough into subdivided parts whose weight and shape are carefully defined. This is accomplished with an inexpensive readily cast construction that is easy and quick to use.

A divider according to this invention comprises a base member which has a bottom surface and an internal peripheral side wall which together form an open-topped cavity. A plate member has a first and a second face, the first face comprising a pressure surface adapted to enter the cavity and initially form the dough such as by flattening the same. The second surface comprises a plurality of divider elements which are spaced apart by recesses with linear tips on these divider elements. The tips are so proportioned and arranged so as to contact the bottom surface and thereby divide the dough into a plurality of sections. Index means is provided for indexing the angular orientation of the tips relative to the side wall in a plurality of positions whereby with dough in the cavity, the pressure surface may be placed in the cavity, pressed against the dough initially to form it, and then the second face may be pressed into the cavity in its two index positions, thereby to divide the dough twice.

According to a preferred but optional feature of the invention, the base member and the plate member are generally square so as to interact with each other to form the index means and to divide the dough into square sections.

The above and other features of this invention will be fully understood from the following detailed description and the accompanying drawings in which:

FIG. 1 is a cross-section showing one portion of the invention;

FIG. 2 is a plan view taken at line 2—2 of FIG. 1;

FIG. 3 is a cross-section showing another portion of the invention;

FIG. 4 is a bottom view of FIG. 3 taken at line 4—4 thereof;

FIG. 5 is a fragmentary cross-section taken at line 5—5 of FIG. 4; and

FIGS. 6 and 7 show the device in two of its operational positions.

The presently preferred embodiment of divider 10 is shown in the drawings, a base member 11 being illustrated in FIG. 1. The base member has a bottom surface 12 which is preferably flat, although it may be contoured, if desired. There is an internal peripheral side wall 13 which intersects the bottom surface and which opens at the top 14 of the base member to form an open-topped cavity 15. Upper surface 16 of the base member lies on a flat plane. As can best be seen in FIG. 2, the peripheral wall is preferably square as is the outside of the base member so that it is a completely square structure. This enables an initial mass of dough to be divided into square sections 17 as shown in FIGS. 1 and 2.

In FIG. 3, there is shown a plate member 20 which has a pair of projecting handles 21, 22 thereon. This plate member has a first face 23 and a second face 24. The first face includes a pressure surface 25 which is preferably planar, although it may be contoured, if desired, and an external wall 26 which is proportioned to make a close fit with the internal peripheral side wall 13. The clearance between these two walls when wall 26 enters wall 13 should not be such as to make a fluid seal and trap air therein, but also should not be so large as to permit scraps of material to form. Clearances of $\frac{1}{16}''-\frac{1}{8}''$ are quite satisfactory for this purpose. The second face includes a plurality of divider elements 27, which divider elements are spaced apart from each other by recesses 28. As can best be seen in FIGS. 4 and 5, these divider elements are parallel to each other and have linear tips 29, which linear tips are adapted to contact the bottom surface of the base member in one operative position. The second face also includes a wall 30, which wall can, if desired, engage side wall 13 in one of the operating positions of the device. When this wall is provided, it is square to conform to the shape of the side wall. Index means is provided for rotationally adjusting the position of the plate member relative to the base member. In the preferred embodiment, the index means includes a plurality of spaced-apart surfaces such as surfaces 31, 32, 33, 34 on the outside of the base member. Engagement means 35, 36 comprise flanges formed on handles 21, 22, respectively, which in one position of the device can overhang and engage respective ones of surfaces 31–34.

The use of the device will be best understood by reference to FIG. 6. As can be seen, a weighed amount of dough 40 has been placed inside the cavity after the cavity and dough have properly been dusted with flour. Then the first face is pressed into the cavity and with wall 26 fitting inside peripheral side wall 13, the plate is pressed down. Preferably, the dimensions are so selected along with the quantity of dough that the handle will contact the upper surface 16 of the base member just about the time that the dough has been completely distributed into a flat form. It will, however, be understood that more dough could be placed therein and that the handles may never contact upper surface 16. At any rate, the first portion of the operation is shown in FIG. 6 where the first face, and especially the pressure surface 25, has pressed and spread the dough into a flat, square piece. Then the plate member is lifted out and reversed so that the second face can be pressed into the cavity and, as shown in FIG. 7, it is pressed down until the linear tips touch the bottom surface along the line. The linear tips all lie on a common plane, and when the plate member is in the position shown in FIG. 7, that plane coincides with the bottom surface 12 of the base member when that surface is itself planar. Of course, if it has some other form, then appropriate meeting of portions of the bottom surface and of the linear tips will be provided for. The height of the wall of the base member must not be such as to prevent the tips from reaching the bottom surface when the handle rests on upper surface 16 of the base member.

It is not necessary that these tips really be sharp to make a cut. In fact, it is preferable for the tips to be somewhat blunt, this serving as a divider instead of a cutter so that the resulting dough sections are somewhat easier to handle. In the position shown in FIG. 7, surfaces 31 and 33 are contacted by engagement means 35, 36, the wall of the base member being embraced by the second face and linear cuts can be made. At this time, an initial division suitable for the long doughnut product known as "long johns" are formed and, depending on the proportions desired, a simple knife cut may be made and the next step omitted. However, if the square sections shown in FIG. 2 are desired to be made, then the plate member is raised, rotated 90° so that engagement means 35 and 36 contact surfaces 32 and 34, and again the plate member is pressed down so that the linear tips contact the bottom surface. Now the division into square sections is complete, the plate member may be removed, and the square sections of dough taken out of the cavity. It will be noted that the recesses are deeper than the expected amount of dough so that there is no impediment to the linear tips reaching the bottom surface. It will also be understood that the bottom surface could be scalloped or otherwise contoured should different contoured bottoms be desired, and this is also true of the shaping of the pressure plate. However, the embodiment shown makes a simple biscuit form suitable for fritters and the like which finds extensive use in the bakery trade. It will be appreciated from an examination of the drawings that this device can readily be cast and inexpensively manufactured. Its use is within the skill of any baker and its cost is low enough that it can be afforded by even the smallest operation.

This invention is not to be limited by the embodiment shown in the drawings and described in the description which is given by way of example and not of limitation, but only in accordance with the scope of the appended claims.

I claim:

1. A divider for dough and the like comprising: a base member having a bottom surface and an internal peripheral side wall forming an open-topped cavity; and a plate member having a first and a second face, said first face comprising a pressure surface adapted to enter the cavity and initially form the dough, said second face comprising a plurality of divider elements spaced apart by recesses, tips on said divider elements so proportioned and arranged as to contact said bottom surface so as to divide the dough into a plurality of sections, and index means for indexing the angular orientation of said tips relative to the side wall in a plurality of positions, whereby with dough in the cavity, the pressure surface may be placed in the cavity and pressed against the dough initially to form it, after which the second face is pressed into the cavity in a first indexed position, is withdrawn, and is then turned to a second indexed position and pressed into the dough, thereby to divide the dough twice.

2. A divider according to claim 1 in which the index means comprises a plurality of angularly spaced-apart index surfaces on one of said members and an engagement means on the other of said elements.

3. A divider according to claim 2 in which the said index surfaces are formed on the base, and in which the engagement means comprises a flange on the plate member.

4. A divider according to claim 1 in which the first face further includes a wall adapted to make a close fit with the peripheral side wall.

5. A divider according to claim 4 in which said wall of said first face and the peripheral side wall are square.

6. A divider according to claim 5 in which the bottom surface is flat, and in which the tips all lie on a common plane.

7. A divider according to claim 6 in which the plate member is provided with projecting handles, and engaging means comprising projections from said handles adapted to engage the outside of the base.

8. A divider according to claim 7 in which the outside of the base is square.

References Cited
UNITED STATES PATENTS

| 215,633 | 5/1879 | Kinerson | 31—7 |
| 384,964 | 6/1888 | Day | 107—68 |
| 2,827,658 | 3/1958 | Hoig et al. | 17—32 |
| 2,950,532 | 8/1960 | Abdela | 31—7 |

WALTER A. SCHEEL, *Primary Examiner.*

J. SHEA, *Assistant Examiner.*